US007442848B2

(12) United States Patent
Staton et al.

(10) Patent No.: US 7,442,848 B2
(45) Date of Patent: Oct. 28, 2008

(54) TREATMENT OF CHEMICAL AGENT HYDROLYSATES

(75) Inventors: John Staton, New Lebanon, OH (US); Steve Schneider, Livonia, MI (US); Louis F. Centofanti, Atlanta, GA (US); David Badger, New Galilee, PA (US); David A. Irvine, Chicago, IL (US); Randall B. Marx, Shaker Heights, OH (US)

(73) Assignee: Perma-Fix Environmental Services, Inc., Atlanta, GA (US)

( * ) Notice: Subject to any disclaimer, the term of this patent is extended or adjusted under 35 U.S.C. 154(b) by 761 days.

(21) Appl. No.: 10/919,227

(22) Filed: Aug. 16, 2004

(65) Prior Publication Data

US 2008/0242913 A1 Oct. 2, 2008

Related U.S. Application Data

(60) Provisional application No. 60/495,312, filed on Aug. 15, 2003, provisional application No. 60/495,620, filed on Aug. 15, 2003, provisional application No. 60/495,621, filed on Aug. 15, 2003.

(51) Int. Cl.

| | |
|---|---|
| ***A62D 3/00*** | (2007.01) |
| ***A62D 3/38*** | (2007.01) |
| ***A62D 101/02*** | (2007.01) |
| ***A62D 101/26*** | (2007.01) |
| ***A62D 101/28*** | (2007.01) |
| ***B01D 11/04*** | (2006.01) |
| ***B09B 1/00*** | (2006.01) |
| ***B09B 3/00*** | (2006.01) |

(52) U.S. Cl. .................... 588/401; 288/249.5; 288/252; 288/255; 288/405; 288/408; 288/409; 288/413; 288/414; 23/306

(58) Field of Classification Search .................. 23/306; 588/249.5, 252, 255, 401, 405, 408, 409, 588/413, 414
See application file for complete search history.

(56) References Cited

U.S. PATENT DOCUMENTS 4,108,746 A 8/1978 Mill et al.

(Continued)

FOREIGN PATENT DOCUMENTS

DE 4036787 C2 5/1992

(Continued)

OTHER PUBLICATIONS

Yang, Y., Chemical Detoxification of Nerve Agent VX, *Acc. Chem. Res.*, vol. 32, pp. 109-115 (1999).

(Continued)

*Primary Examiner*—Timothy C. Vanoy
*Assistant Examiner*—Serena L Hanor
(74) *Attorney, Agent, or Firm*—Buchanan Ingersoll & Rooney PC

(57) ABSTRACT

The present invention relates generally to the destruction of chemical weapons. In particular, the present invention relates to methods for treating hydrolysates of chemical agents. In one embodiment, the present invention provides a method comprising oxidizing a hydrolysate of a chemical agent to produce an aqueous layer and an organic layer, the aqueous layer comprising an organophosphorus concentration and the organic layer comprising an organosulfur concentration, and separating the organic layer from the aqueous layer.

26 Claims, 2 Drawing Sheets

U.S. PATENT DOCUMENTS

| | | | | |
|---|---|---|---|---|
| 4,301,014 | A * | 11/1981 | Buckholtz et al. | 210/721 |
| 4,391,711 | A * | 7/1983 | Jackson et al. | 210/634 |
| 5,648,591 | A * | 7/1997 | Donecker et al. | 588/319 |
| 6,080,906 | A | 6/2000 | Johnson et al. | |
| 6,096,283 | A | 8/2000 | Cooper et al. | |
| 6,121,506 | A | 9/2000 | Abel et al. | |
| 6,498,281 | B1 * | 12/2002 | Lupton | 588/309 |
| 6,566,574 | B1 * | 5/2003 | Tadros et al. | 252/186.41 |
| 6,723,891 | B1 * | 4/2004 | Wagner et al. | 588/316 |
| 2002/0156336 | A1 * | 10/2002 | Pak | 588/205 |
| 2003/0009074 | A1 | 1/2003 | Morrissey | |
| 2004/0022867 | A1 * | 2/2004 | Tucker et al. | 424/616 |
| 2004/0231512 | A1 * | 11/2004 | Slayzak et al. | 95/211 |
| 2005/0161524 | A1 * | 7/2005 | Nyman et al. | 239/11 |

FOREIGN PATENT DOCUMENTS

| | | | |
|---|---|---|---|
| EP | 0512660 | A | 11/1992 |
| JP | 09085261 | A | 3/1997 |
| WO | WO 01/10504 | A3 | 2/2001 |
| WO | WO 2005/081673 | A2 | 9/2005 |

OTHER PUBLICATIONS

Yang, Y., et al., Decontamination of Chemical Warfare Agents, *Chem. Rev.*, vol. 92, pp. 1729-1749 (1992).

* cited by examiner

TREATMENT OF CHEMICAL AGENT HYDROLYSATES

PRIOR RELATED U.S. APPLICATION DATA

This application claims priority to U.S. provisional patent applications Ser. Nos. 60/495,312 (filed Aug. 15, 2003), 60/495,620 (filed Aug. 15, 2003), and 60/495,621 (filed Aug. 15, 2003).

FIELD OF THE INVENTION

The present invention relates generally to methods for the destruction of chemical weapons. In particular, the present invention relates to novel methods for treating hydrolysates of chemical agents utilized to construct chemical weapons.

BACKGROUND OF THE INVENTION

Destruction of chemical weapons is a paramount international concern that has initiated the passage of international treaties, such as the United Nations' Chemical Weapons Convention Treaty, outlawing chemical weapon development, production, and stockpiling. More importantly, these international treaties require signatory countries to effectuate a scheduled destruction of chemical weapon and chemical agent stockpiles.

Destruction of chemical agents is conventionally achieved by means of incineration. Although incineration represents a technically feasible approach to the destruction of chemical agents, it is not acceptable to the many State and local governments and communities neighboring the stockpile sites. The major concerns of these entities include the perceived health hazards associated with air emissions from incinerators.

In view of the perceived hazards resulting from incineration, alternative methods have been developed to destroy chemical agents used in chemical weapons. One promising alternative method destroys or neutralizes chemical agents by hydrolyzing the chemical agents. Several significant problems exist, however, in hydrolyzing chemical agents. One problem is the caustic, odiferous, and toxic nature of the resulting hydrolysate. Additionally, hydrolysates contain precursors of the chemical agent, which presents additional problems in relation to regulatory compliance. Chemical weapons treaties specify that in order to realize complete destruction of a chemical agent, any precursors capable of reacting to reform the chemical agent must additionally be destroyed.

In view of these problems, it would be desirable to provide methods for the treatment of chemical agent hydrolysates that reduce the toxicity of the hydrolysate while rendering chemical precursors inoperable to react in reforming the hydrolyzed chemical agent.

SUMMARY OF THE INVENTION

The present invention provides methods for the treatment of chemical agent hydrolysates. In particular, the present invention successfully enables the treatment of chemical agent hydrolysates that reduce the toxicity of the hydrolysate while rendering constituent chemical precursors inoperable to react in reforming the hydrolyzed agent.

In one embodiment, the present invention provides a method comprising oxidizing a hydrolysate of a chemical agent to form an aqueous layer and an organic layer; wherein the aqueous layer comprises an organophosphorus concentration and the organic layer comprises an organosulfur concentration; wherein the organic layer is separated from the aqueous layer.

In another embodiment, the present invention provides a method comprising oxidizing a hydrolysate of a chemical agent to form an aqueous layer and an organic layer, the aqueous layer comprising an organophosphorus concentration and the organic layer comprising an organosulfur concentration, and oxidizing and precipitating the organophosphorus concentration from the aqueous layer.

In another embodiment, the present invention provides a method comprising oxidizing an organophosphorus concentration of a chemical agent hydrolysate solution and precipitating the oxidized organophosphorus from the hydrolysate solution.

A feature and advantage of the present invention is that methods of the present invention may be used for the treatment of chemical agent hydrolysates resulting in the destruction of chemical agent precursors thereby ensuring compliance with international chemical weapon treaties.

With the foregoing and other advantages and features of the invention that will become hereinafter apparent, the nature of the invention may be more clearly understood by reference to the following non-limiting detailed description of the invention and the several views illustrated in the drawings.

DETAILED DESCRIPTION OF THE INVENTION

Figure 1:
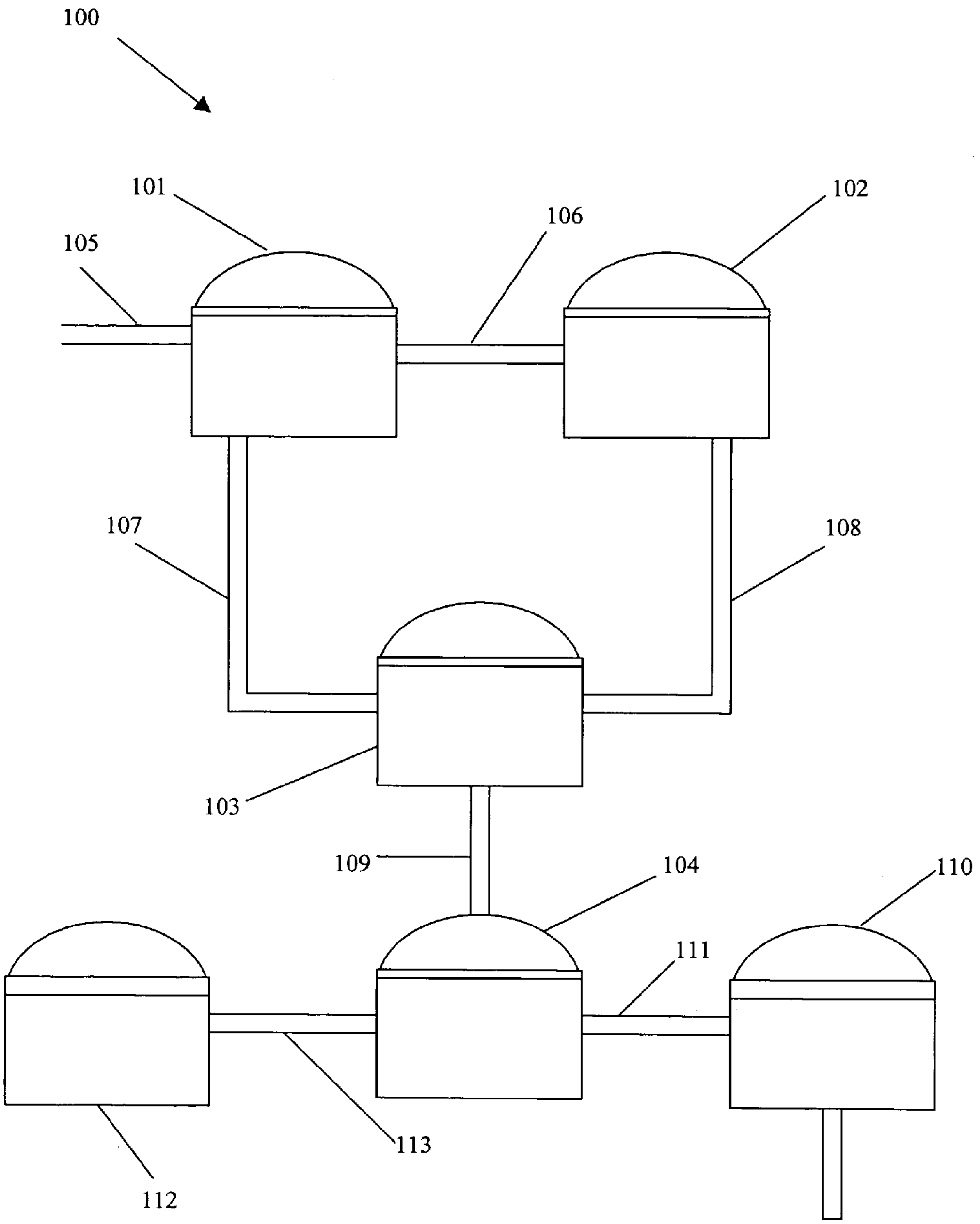
FIG. 1 is an illustration of one environment for implementation of an embodiment of the present invention.

The present invention provides methods for the treatment of chemical agent hydrolysates. Methods of the present invention may be advantageously utilized in the destruction of chemical agent precursors present in hydrolysates rendering the precursors incapable of reforming the chemical agent. Hydrolysates of chemical agents comprising VX, Russian VX (RVX), Sarin (GB), Soman (GD), and Tabun (GA) may be treated in accordance with methods of the present invention.

Reference is made below to specific embodiments of the present invention. Each embodiment is provided by way of explanation of the invention, not as a limitation of the invention. In fact, it will be apparent to those skilled in the art that various modifications and variations can be made in the present invention without departing from the scope or spirit of the invention. For instance, features illustrated or described as part of one embodiment may be incorporated into another embodiment to yield a further embodiment. Thus, it is intended that the present invention cover such modifications and variations as come within the scope of the appended claims and their equivalents.

For the purposes of this specification, unless otherwise indicated, all numbers expressing quantities of ingredients, reaction conditions, and so forth used in the specification are to be understood as being modified in all instances by the term "about." Accordingly, unless indicated to the contrary, the numerical parameters set forth in the following specification are approximations that can vary, depending upon the desired properties sought to be obtained with the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein, and every number between the end points. For example, a stated range of "1 to 10" should be considered to include any and all subranges between (and inclusive of) the minimum value of 1 and the maximum value of 10; that is, all subranges beginning with a minimum value of 1 or more, e.g., 1 *to* 6.1, and ending with a maximum value of 10 or less, e.g., 5.5 *to* 10, as well as all ranges beginning and ending within the end points, e.g., 2 to 9, 3 to 8, 3.2 to 9.3, 4 to 7, and finally to each number 1, 2, 3, 4, 5, 6, 7, 8, 9 *and* 10 contained within the range. Additionally, any reference referred to as being "incorporated herein" is to be understood as being incorporated in its entirety.

It is further noted that, as used in this specification, the singular forms "a," "an," and "the" include plural referents unless expressly and unequivocally limited to one referent.

In an embodiment, a method of the present invention for treating a hydrolysate of a chemical agent comprises oxidizing the hydrolysate to form an aqueous layer and an organic layer, the aqueous layer comprising an organophosphorus concentration and the organic layer comprising an organosulfur concentration, and separating the organic layer from the aqueous layer.

Referring now to the drawings in which like numerals indicate like elements throughout the several figures, FIG. 1 is an illustration of one environment for implementation of an embodiment of the present invention. The environment illustrated in FIG. 1 comprises an apparatus 100 comprising a first treatment tank 101, a second treatment tank 102, a mixing tank 103, a pre-bioreactor equalization tank 104, an organic matter supply tank 112, and a bioreactor 110. The apparatus 100 of FIG. 1 may further comprise piping systems 105, 106, 107, 108, 109, 111, and 113.

Figure 2:
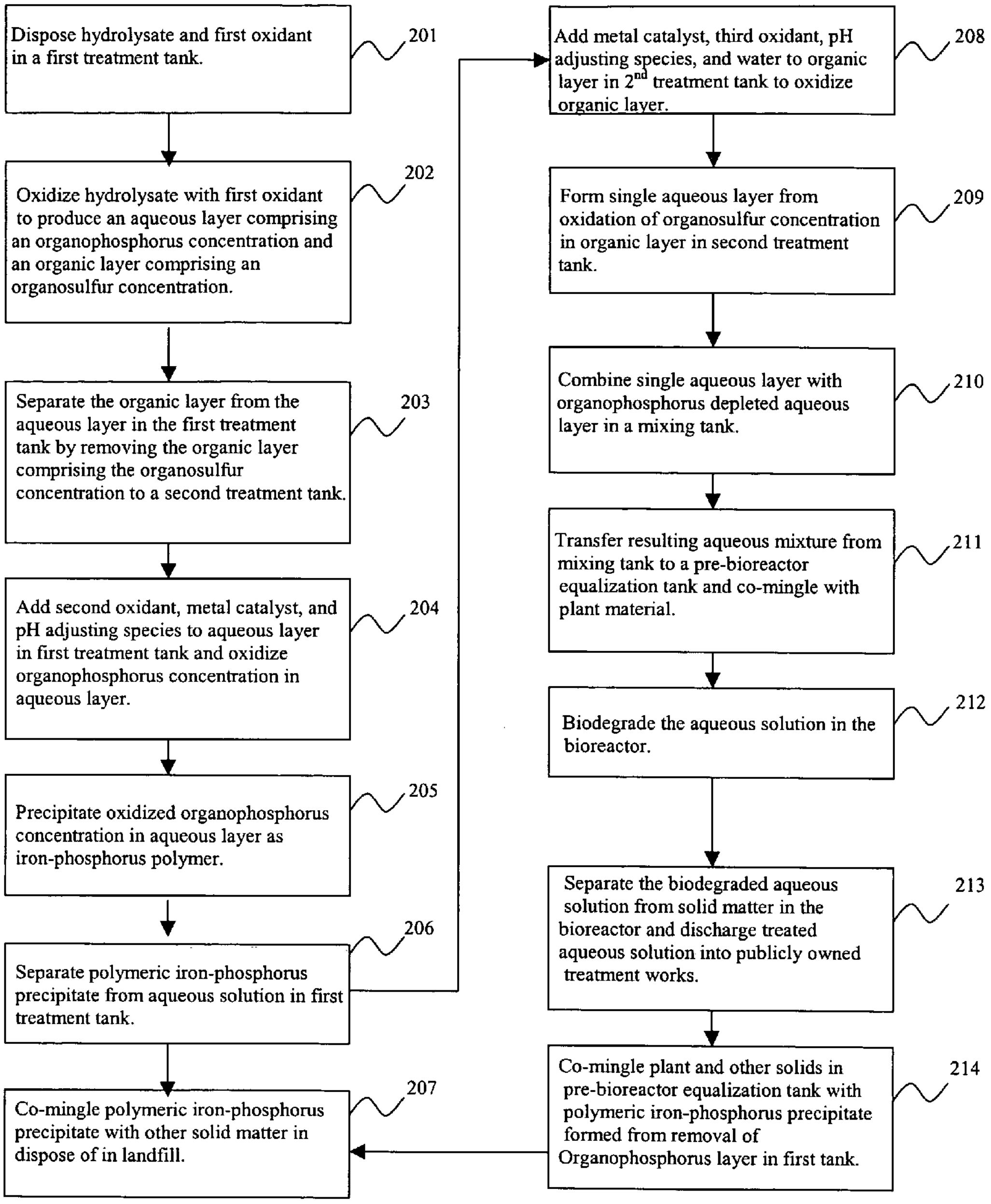
FIG. 2 illustrates a flowchart for a method according to an embodiment of the present invention.

Moreover, FIG. 2 is a flowchart illustrating a method according to an embodiment of the present invention. The method illustrated in FIG. 2 is described with reference to the treatment of a VX nerve agent hydrolysate. Additionally, the method illustrated in FIG. 2 is further described with reference to the environment of the apparatus 100 of FIG. 1. The presently described method, however, is not limited to a hydrolysate of a VX nerve agent, nor is it limited to the environment of the apparatus 100 of FIG. 1. Other chemical agents, such as Russian VX (RVX), may be degraded according to the presently described method.

A VX nerve agent hydrolysate and a first oxidant may be disposed in a first treatment tank (101) 201. The VX nerve agent hydrolysate, for example, may flow into the first treatment tank (101) through a piping system (105). Oxidants suitable for serving as a first oxidant in the present method may comprise peroxides such as hydrogen peroxide ($H_2O_2$), oxygen, ozone, air, hypochlorite, persulfate, permanganate, or any combination thereof. The first oxidant oxidizes chemical components of the hydrolysate to generate an aqueous layer and an organic layer, the aqueous layer comprising an organophosphorus concentration and the organic layer comprising an organosulfur concentration 202. In the present embodiment, water-soluble thiolamines, such as 2-(diisopropylamino) ethanethiol, present in the VX hydrolysate are oxidized to water-insoluble disulfides. The oxidant may be added in a stoichiometric amount to oxidize substantially all of the thiolamine concentration to a disulfide concentration. In embodiments where the added oxidant decomposes due to side reactions with the hydrolysate, the amount of oxidant added may exceed the stoichiometric amount. Moreover, the stoichiometric amount of oxidant added may vary depending on the identity of the oxidant chosen, but a molar ratio of oxidizing agent to thiolamine will generally range from about 0.5 to 1 to about 5 to 1. The oxidation of water-soluble thiolamines into water-insoluble disulfides generates an organic layer containing the disulfides. Moreover, the aqueous layer formerly containing the water-soluble thiolamines of VX hydrolysate, as well as other organophosphorus compounds, now comprises various phosphonic acids such as methylphosphonic acid (MPA) and ethylmethylphosphonic acid (EMPA). Introduction of a first oxidant to the chemical agent hydrolysate immediately initiates the oxidation reaction. In some embodiments of the present invention, oxidation of the chemical agent hydrolysate by a first oxidant may be allowed to continue for up to one (1) hour.

After production of an aqueous layer comprising an organophosphorus concentration and an organic layer comprising an organosulfur concentration, the organic layer may be separated from the aqueous layer by removing the organic layer to a second treatment tank (102) 203. The organic layer may be removed to a second treatment tank (102) through a piping system (106) which places the first treatment tank (101) in communication with the second treatment tank (102). The aqueous layer remains in the first treatment tank (101).

After separation of the organic layer from the aqueous layer, the organophosphorus concentration may be removed from the aqueous layer. Removing the organophosphorus concentration from the aqueous layer comprises oxidizing the organophosphorus concentration, precipitating the oxidized organophosphorus concentration comprising inorganic and organic phosphorus compounds from the aqueous layer, and separating the precipitated phosphorus concentration from the aqueous layer. As previously described, the phosphorus concentration of the aqueous layer comprises methyl phosphonic acid (MPA) and/or ethylmethylphosphonic acid (EMPA). Oxidation of these chemical species may lead to their irreversible decomposition since carbon-phosphorus bonds are attacked in the oxidation process thereby removing the methyl group from the phosphorus atom. Irreversible decomposition of these VX chemical agent precursors may preclude their recombination with thiolamines in reconstructing the chemical agent thereby ensuring chemical compliance with international chemical warfare treaties.

Oxidation of the organophosphorus concentration of the aqueous layer comprises adding a metal catalyst, second oxidant, and pH adjusting chemical species to the first treatment tank (101) 204. Oxidants suitable for serving as a second oxidant comprise peroxides, such as hydrogen peroxide, oxygen, ozone, air, hypochlorite, or any combination thereof. The second oxidant may be added in a stoichiometric amount to oxidize substantially all the MPA and EMPA in the aqueous layer. The molar ratio of second oxidizing agent to MPA and EMPA may be from about 5 *to* 1 to about 40 to 1.

Metal catalysts suitable for use in the oxidation of MPA and EMPA may comprise iron, magnesium, or combinations thereof. Iron catalysts comprising divalent ($Fe^{+2}$) and trivalent iron ($Fe^{=3}$), for example, may be obtained from commercial entities known to those skilled in the art such as Beckart Environmental, Inc. of Kenosha, Wis. The stoichiometric amount of metal catalyst added to the aqueous layer may be sufficient to produce a molar ratio of metal catalyst to MPA and EMPA ranging from about 0.5 *to* 1 *to about* 3 *to* 1.

A pH adjusting chemical species may be added to the aqueous layer in a sufficient amount to adjust the pH of the layer to reside within a pH range from about 4.5 to about 6.0. Suitable pH adjusting chemical species for addition to the aqueous layer may comprise sodium hydroxide, lye, and/or potassium hydroxide.

The second oxidant, metal catalyst, and pH adjusting species are mixed with the aqueous layer such as by stirring and the resulting solution may be allowed to sit for any time period, during which oxidation may occur. In some embodiments, depending on the concentration of the chemical agent hydrolysate, the time period for oxidation of the aqueous layer may range from about 15 minutes to about 10 hours. In the oxidation process, EMPA in the aqueous layer may be oxidized to MPA while MPA in the aqueous layer may be oxidized to ortho phosphate ($PO_4^{3-}$). MPA, ortho-phosphate, are susceptible to precipitation from an aqueous mixture as iron-phosphorus polymers. As a result, when iron is present in the aqueous layer, the MPA and ortho-phosphate produced in the oxidation of the aqueous layer by the second oxidant precipitates as an iron-phosphorus polymer 205. In embodiments of the present invention, additional iron may be added to the aqueous solution after oxidation to precipitate further amounts of MPA and ortho-phosphate as iron-phosphorus polymer.

The resulting iron-phosphorus polymer precipitate may be separated from the aqueous solution in the first treatment tank by filtration 206 or any other means known to one of ordinary skill in the art. Once separated, the iron-phosphorus polymer precipitate may be combined with other solid waste such as plant material and safely disposed of in a suitable location, such as a landfill. The removal of the iron-phosphorus polymer generates an aqueous layer depleted of phosphorus containing compounds.

Similarly, the organosulfur concentration may be removed from the organic layer. Removing the organosulfur concentration from the organic layer comprises, for example, oxidizing the organosulfur concentration of the organic layer to form a single aqueous layer, combining the single aqueous layer with the phosphorus-depleted aqueous layer and biological material to produce a mixture, and biologically degrading the mixture.

As previously described, the organosulfur layer produced by oxidation of the VX hydrolysate comprises disulfides. Oxidation of the disulfides in a second treatment tank (102) comprises adding a third oxidant, water, and a pH adjusting chemical species to the organic layer in the second treatment tank (102) 208. Oxidants suitable for serving as a third oxidant comprise a metal catalyst such as iron in conjunction with oxygen, ozone, air, hypochlorite, peroxides such as hydrogen peroxide, or any combination thereof. The third oxidant may be added in a stoichiometric amount to oxidize substantially all of the disulfide concentration in the organic layer. The molar ratio of third oxidizing agent to disulfide concentration may range from about 3 to 1 to about 30 to 1.

A pH adjusting chemical species may be added to the organic layer in a sufficient amount to adjust the pH of the layer to reside with a pH range from about 4.5 to about 6.0. Suitable pH adjusting chemical species for addition to the organic layer comprise sodium hydroxide, lye, and/or potassium hydroxide. Water may be added to the organic layer at a volume of 2.5 times the volume of the organic layer.

The third oxidant, pH adjusting species, and water are mixed by stirring, and the resulting solution may be allowed to sit for any time period, during which oxidation may occur. The oxidation of disulfides in the organic layer transforms the organic layer into a single aqueous layer in the second treatment tank (102) 209. Disulfides in the organic layer may be oxidized to various water-soluble sulfates thereby transforming the organic layer into a single aqueous layer.

The single aqueous layer formed by the oxidation of the organic layer in the second treatment tank (102) may be combined with the phosphorus-depleted aqueous layer of the first treatment tank (101) 210. Combination of the single aqueous layer with the phosphorus-depleted aqueous layer may comprise mixing the two aqueous layers in a mixing tank (103). In other embodiments, the single aqueous layer formed by the oxidation of the organic layer in the second treatment tank (102) may be returned to the first treatment tank (101) for combination with the phosphorus-depleted aqueous layer.

The aqueous solution resulting from the combination of the single aqueous layer in the second treatment tank (102) with the phosphorus-depleted layer of the first treatment tank (101) may be transferred to a pre-bioreactor equalization tank (104) 211 where the aqueous solution may be commingled with organic material such as plant flow. The plant flow may be introduced in the pre-bioreactor (104) from an organic matter storage tank (112) in communication with the pre-bioreactor through a piping system (113). The aqueous solution may be biodegraded in a bioreactor (110) downstream from the equalization tank (104) 212. When operated in batch mode the bioreactor may require a time period of 6-24 hours for degradation of the treated hydrolysate. The bioreactor may have a hydraulic residence time of 5-20 days and a solids retention time of 20-100 days.

After biological degradation (212), the aqueous solution may be separated from solid matter in the bioreactor (110) 213. Separation of the aqueous solution from solid matter may be achieved through filtration of the solution or by any other separation technique known to one of ordinary skill in the art. Sedimentation, for example, may be another method by which the aqueous solution may be separated from solid matter in the bioreactor (110). The separated aqueous solution may be tested for permitted effluent limits and Schedule 2 compounds before being discharged. The separated aqueous solution may be discharged, for example, into a local publicly owned treatment works as non-hazardous water.

The solids removed from the aqueous solution in the bioreactor (110) may be commingled with the phosphorus precipitate produced in the removal of the organophosphorus concentration from the aqueous layer in the first treatment tank (101) 214. The commingled solids may be disposed in an appropriate landfill 207.

In some embodiments, the phosphorus-depleted aqueous layer may proceed directly to the biodegradation step (212) without being mixed with the single aqueous layer produced from the oxidation of an organosulfur concentration. The pH of the phosphorus-depleted aqueous layer may be adjusted to reside within a range from about 6 to 8 and further treated biologically prior to discharge. The biologically treated phosphorus-depleted aqueous layer may be discharged, for example, into a publicly owned treatment works or may discharged or otherwise disposed of in any manner known to one of ordinary skill in the art. In other embodiments, the phosphorus-depleted aqueous layer may be combined with additional waste streams comprising biologically degradable compounds before undergoing biological treatment.

Similarly, in some embodiments, the single aqueous phase produced from the oxidation of the organic layer comprising an organosulfur concentration may proceed directly to the biodegradation step (212) without being mixed with the phosphorus-depleted aqueous layer. Moreover, the single aqueous layer may be mixed with other waste streams comprising biologically degradable compounds before undergoing biological treatment. The biologically treated single aqueous layer may be discharged into a body of water such as a publicly owned treatment works or may otherwise be disposed of in any manner known to one of ordinary skill in the art.

In other embodiments, oxidation products of the organosulfur compounds produced in the oxidation of the organic layer comprising an organosulfur concentration may be precipitated with metal salts comprising iron. Ferric chloride and/or ferrous sulfate, for example, may be used to precipitate organosulfur compounds produced in the oxidation of the organic layer comprising an organosulfur concentration.

In a further embodiment, a chemical agent hydrolysate may be treated with a first oxidant as previously described to form an aqueous layer and an organic layer, the aqueous layer comprising an organophosphorus concentration and the organic layer comprising an organosulfur concentration. The organic layer may be separated from the aqueous layer. Subsequent to separation from the aqueous layer, the organic layer may be treated with an oxidant, pH adjusting species, and water as previously described. Moreover, the organophosphorus concentration may be removed from the aqueous layer in the absence of a second oxidant by the addition of a metal salt. Metal ions of the salts may precipitate the phosphorus containing compounds, such as MPA and ortho-phosphorus, from the aqueous layer as metal-phosphorus polymers. Metal salts suitable for precipitating the phosphorus containing compounds in the aqueous phase according to the present embodiment may comprise those of iron. Ferrous sulfate and ferric chloride, for example, may precipitate phosphorus containing compounds from the aqueous layer. The aqueous layer may be filtered to remove the phosphorus containing precipitate to form a phosphorus-depleted aqueous layer. The phosphorus-depleted aqueous layer and oxidized organic layer may be recombined and biodegraded in a bioreactor as previously described.

In another embodiment, a method of the present invention comprises oxidizing a hydrolysate of a chemical agent to form an aqueous layer and an organic layer, the aqueous layer comprising an organophosphorus concentration and the organic layer comprising an organosulfur concentration, and oxidizing and precipitating the organophosphorus concentration from the aqueous layer. The present method is similar to the preceding method described with reference to FIGS. 1 and 2. In the present method, however, the organic layer is not separated from the aqueous layer subsequent to the initial oxidation.

According to the present method, a hydrolysate of a chemical agent and a first oxidant may be disposed in a treatment tank or vessel. Oxidants suitable for serving as a first oxidant in the present method may comprise hydrogen peroxide oxygen, ozone, air, hypochlorite, persulfate, permanganate, or any combination thereof. The first oxidant oxidizes chemical components of the hydrolysate to generate an aqueous layer and an organic layer, the aqueous layer comprising an organophosphorus concentration and the organic layer comprising an organosulfur concentration. Water soluble thiolamines, such as 2-(diisopropylamino)ethanethiol, present in the chemical agent hydrolysate are oxidized into water insoluble disulfides. The oxidant may be added in a stoichiometric amount to oxidize substantially all of the thiolamine concentration into a disulfide concentration. In embodiments where the oxidant decomposes due to side reactions in the hydrolysate, the amount of oxidant added may exceed the stoichiometric amount. Moreover, the stoichiometric amount of oxidant may vary depending on the identity of the oxidant chosen, but a molar ratio of oxidizing agent to thiolamine will generally range from about 0.5 to 1 to about 5 to 1. The oxidation of water-soluble thiolamines into water-insoluble disulfides generates an organic layer containing the disulfides. Moreover, the aqueous layer formerly containing the water-soluble thiolamines of the hydrolysate, as well as other organophosphorus compounds, comprises various phosphonic acids such as methylphosphonic acid (MPA) and ethylmethylphosphonic acid (EMPA). Introduction of a first oxidant to the chemical agent hydrolysate immediately initiates the oxidation reaction. In some embodiments of the present invention, oxidation of the chemical agent hydrolysate by a first oxidant may be allowed to continue for up to one (1) hour.

After production of an aqueous layer and organic layer, the organophosphorus concentration of the hydrolysate may be oxidized and precipitated from the aqueous layer. Oxidation and precipitation of the organophosphorus concentration comprises adding a second oxidant, metal catalyst, and pH adjusting species to the hydrolysate solution. The hydrolysate solution at this juncture comprises the aqueous layer and organic layer as the step of separating the organic layer from the aqueous layer has been omitted in the present method. Oxidants suitable for serving as a second oxidant in the present method are similar those oxidants which may serve as a second oxidant in the preceding method. Suitable second oxidants for the present method comprise oxygen, air, hypochlorite, and peroxides such as hydrogen peroxide and/or ozone. The second oxidant may be utilized in conjunction with a metal catalyst such as iron.

The oxidant may be added in a stoichiometric amount to oxidize substantially all of the organophosphorus concentration in the hydrolysate solution. The molar ratio of the oxidizing agent to the organophosphorus concentration may range from about 1 to 1 to about 40 to 1. Moreover, the stoichiometric amount of metal catalyst added to the hydrolysate solution may be sufficient to produce a molar ratio of metal catalyst to organophosphorus concentration ranging from about 0.5 to 1 to about 3 to 1.

A pH adjusting chemical species may be added to the hydrolysate solution in a sufficient amount to adjust the pH of the solution to reside with a pH range from about 4.5 to about 6.0.

The oxidant, metal catalyst, and pH adjusting species are mixed with the hydrolysate solution in the first treatment tank by stirring, and the resulting solution may be allowed to sit for any time period, during which oxidation may occur. In some embodiments, depending on the concentration of the chemical agent hydrolysate, the time period for oxidation of the hydrolysate solution may range from about 15 minutes to about 10 hours. In the oxidation reaction, the organophosphorus concentration is oxidized to methyl-phosphonic acid (MPA) and ortho-phosphate ($PO_4^{3-}$). As previously described, MPA, EMPA, ortho-phosphate, and other organophosphonates are susceptible to precipitation from an aqueous mixture as iron-phosphorus polymers. As a result, when iron is present in the hydrolysate solution, the MPA and ortho-phosphate produced in the oxidation of the hydrolysate solution may precipitate as an iron-phosphorus polymer. In other embodiments, additional iron may be introduced into the first treatment tank after oxidation to precipitate further amounts of MPA and ortho-phosphate as iron-phosphorus polymer.

The resulting iron-phosphorus polymer precipitate may be separated from the hydrolysate solution in the first treatment tank by filtration or any other means known to one of ordinary skill in the art. Once separated, the iron-phosphorus polymer precipitate may be combined with other solid waste such as plant material and safely disposed of in a landfill. The removal of the iron-phosphorus polymer generates a depleted organophosphorus aqueous layer and renders organophosphorus precursors of a chemical agent hydrolysate incapable of reforming the chemical agent.

The organophosphorus depleted hydrolysate solution may subsequently proceed to a pre-bioreactor equalization tank and bioreactor (110) for biodegradation. In some embodiments, the oxidation of the hydrolysate solution by the second oxidant may consume the organic layer comprising the organosulfur concentration. In such embodiments, the organic layer is transformed into a substantially aqueous layer comprising inorganic and organic sulfates. This newly formed aqueous layer comprising sulfates may be miscible with the phosphorus-depleted aqueous layer and subsequently proceeds to the biodegradation step with the phosphorus-depleted aqueous layer.

In biodegrading the organophosphorus depleted hydrolysate solution, the pH of the hydrolysate solution is adjusted to reside within a range from about 6 to 8. The organophosphorus hydrolysate solution may be combined with plant and/or other organic material and subsequently biodegraded. The biodegraded organophosphorus depleted hydrolysate solution may be discharged into a body of water such as a publicly owned treatment works or may be disposed of in any other manner known to one of ordinary skill in the art.

In some embodiments, before biodegradation, the organophosphorus depleted hydrolysate solution may be combined with other waste streams comprising biologically degradable compounds.

In another embodiment of the present invention, a method comprises oxidizing an orgnophosphorus concentration of a chemical agent hydrolysate solution and precipitating the oxidized organophosphorus concentration from the hydrolysate solution. Hydrolysates suitable for use with the present method comprise hydrolysates containing a water-soluble organophosphorus concentration. Hydrolysates of Sarin (GB), Soman (GD), and Tabun (GA) in addition to the aqueous component of an oxidized VX hydrolysate, for example, are suitable for treatment by the present method.

The oxidation and precipitation of the organophosphorus concentration of a hydrolysate solution may occur in a manner substantially similar to the removal of the organophosphorus concentration from the aqueous layers described in the previous methods. It is important to note that oxidation of the hydrolysate solution in the present method does not produce an organic layer thereby precluding the need to for an initial oxidation step comprising a first oxidant.

Accordingly, a hydrolysate solution, oxidant, metal catalyst, and pH adjusting species may be disposed in a first treatment tank. Oxidants, metal catalysts, and pH adjusting chemical species suitable for the oxidation process of the present method are similar to those described for the oxidation of the aqueous organophosphorus concentration in the preceding methods. Suitable oxidants for the present method, for example, are similar those which may serve as a second oxidant in the preceding methods and comprise peroxides, such as hydrogen peroxide and ozone, oxygen, air, and hypochlorite. The oxidant is utilized in conjunction with a metal catalyst such as iron.

The oxidant may be added in a stoichiometric amount to oxidize substantially all of the organophosphorus concentration in the hydrolysate solution. The molar ratio of the oxidizing agent to the organophosphorus concentration may range from about 1 to 1 to about 40 to 1. Moreover, the stoichiometric amount of metal catalyst added to the hydrolysate solution may be sufficient to produce a molar ratio of metal catalyst to organophosphorus concentration ranging from about 0.5 to 1 to about 3 to 1.

A pH adjusting chemical species may be added to the hydrolysate solution in a sufficient amount to adjust the pH of the solution to reside with a pH range from about 4.5 to about 6.0.

The oxidant, metal catalyst, and pH adjusting species are mixed with the hydrolysate solution in the first treatment tank by stirring, and the resulting solution may be allowed to sit for a time period during which oxidation may occur. In some embodiments, depending on the concentration of the chemical agent hydrolysate, the time period for oxidation of the hydrolysate solution may range from about 15 minutes to about 10 hours. In the oxidation reaction, the organophosphorus concentration is oxidized to methyl-phosphonic acid (MPA) and ortho-phosphorus ($PO_4^{3-}$). As previously described, MPA and ortho-phosphorus are susceptible to precipitation from an aqueous mixture of as iron-phosphorus polymers. As a result, when iron is present in the hydrolysate solution, the MPA and ortho-phosphorus produced in the oxidation of the hydrolysate solution may precipitate as an iron-phosphorus polymer. In other embodiments, additional trivalent iron may be introduced into the first treatment tank after oxidation to precipitate further amounts of MPA and ortho-phosphorus as iron-phosphorus polymer.

The resulting iron-phosphorus polymer precipitate may be separated from the hydrolysate solution in the first treatment tank by filtration or any other means known to one or ordinary skill in the art. Once separated, the iron-phosphorus polymer precipitate may be combined with other solid waste such as plant material and safely disposed of in a landfill. The removal of the iron-phosphorus polymer generates a depleted organophosphorus aqueous layer and renders organophosphorus precursors of a chemical agent hydrolysate incapable of reforming the chemical agent.

The organophosphorus depleted hydrolysate solution may subsequently proceed to a pre-bioreactor equalization tank for biodegradation. In biodegrading the organophosphorus depleted hydrolysate solution, the pH of the hydrolysate solution is adjusted to reside within a range from about 6 *to* 8. The organophosphorus hydrolysate solution may be combined with plant and/or other organic material and subsequently biodegraded. The biodegraded organophosphorus depleted hydrolysate solution may be discharged into a body of water such as a publicly owned treatment works or may be disposed of in any other manner known to one of ordinary skill in the art.

In some embodiments, before biodegradation, the organophosphorus depleted hydrolysate solution may be combined with other waste streams comprising biologically degradable compounds.

EXAMPLE 1

About 3.8 liters (one gallon) of VX hydrolysate comprising 10% VX load [1 M thiolamine, 1 M phosphonates (EMPA and MPA)] and a pH of 14 is disposed in a first treatment tank or reaction vessel. The VX hydrolysate is stirred, and about 230 mL of 50% hydrogen peroxide ($H_2O_2$) is added to oxidize the VX hydrolysate in the first treatment tank. The oxidation of the VX hydrolysate produces an aqueous layer comprising an organophosphorus concentration and an organic layer comprising an organosulfur concentration. In the present example, the organic layer is not separated from the aqueous layer.

The pH of the oxidized hydrolysate solution is adjusted to a value of about 8 with the addition of about 270 mL of concentrated sulfuric acid. The hydrolysate solution is then subjected to a second oxidation. In the oxidation process, about 4 liters of 5-7% aqueous iron as $FeSO_4*7H_2O$ is added to the solution. The pH of the hydrolysate solution is further adjusted to about 6 with concentrated sulfuric acid. The solution is heated to 50° C. and about 8 liters of 50% hydrogen peroxide ($H_2O_2$) is added to the hydrolysate solution over a 4 hour period. The pH of the solution is maintained at a pH of 5 with 50% sodium hydroxide (NaOH) and the temperature of the hydrolysate solution is maintained between 60° C. and 90° C. over the course of the oxidation. The hydrolysate solution is allowed to cool for 1 hour.

The resulting phosphorus containing precipitate is filtered from the solution with a filter press. The phosphorus containing precipitate is disposed of accordingly. The ammonia concentration of the phosphorus-depleted hydrolysate solution is stripped from the solution. The pH of the phosphorus depleted hydrolysate solution is adjusted to a value of 12 with 50% sodium hydroxide (NaOH). Generally, the addition of about 500 mL of NaOH is required to adjust the pH of the solution to a value of 12. The hydrolysate solution is subsequently sparged with air until ammonia specifications are met (about 2 h to 50 mg/L).

The phosphorus-depleted solution is blended with plant flow such that the total dissolved solids (TDS) level is less than 3%. The blended solution is added to an acclimated, aerated sequencing batch reactor (SBR). The microorganism ratio (TOC:MLSS) in the SBR is about equal to 0.2 wherein TOC=total organic carbon and MLSS=mixed liquor suspended solids. The blended phosphorus-depleted solution is biodegraded and the resulting effluent is discharged from the biological treatment system. The effluent is discharged at a hydraulic retention time (HRT) of about 10 days. The effluent may be polished if necessary to meet permit requirements. Settled solids may be discharged at a solids-retention time (SRT) of about 50 days.

TABLE 1

Concentrations of Schedule 2 Compounds and $CBOD_5$ in the Hydrolysate Treatment Process (in Percent)

| Process Stream | MPA | EMPA | Thiolamine | $CBOD_5$ |
|---|---|---|---|---|
| Initial | 1 | 8 | 10 | 0.8 |
| After mild oxidation | 1 | 8 | <0.01 | 0.8 |
| After pH adjustment | 1 | 8 | <0.01 | 0.8 |
| After strong oxidation | 0.4 | 0.2 | <0.01 | 0.7 |
| After ammonia removal | 0.4 | 0.2 | <0.01 | 0.7 |
| After mixing with plant flow | 0.08 | 0.03 | <0.01 | 0.07 |
| After carbon polishing | 0.08 | 0.03 | <0.01 | 0.01 |
| At discharge point | 0.08 | 0.03 | <0.01 | 0.01 |

Table 1 displays the results of treatment of a VX hydrolysate according to a method of the present invention. As illustrated in Table 1, the organophosphorus concentration of the hydrolysate is significantly reduced thereby rendering the organophosphorus precursors inoperable to recombine with other chemical species in the hydrolysate to reform the chemical agent.

The foregoing description of embodiments of the present invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

What is claimed is:

1. A method of treating a hydrolysate of a chemical agent, comprising:

oxidizing a hydrolysate of a chemical agent to form an aqueous layer and an organic layer, the aqueous layer comprising an organophosphorus concentration and the organic layer comprising an organosulfur concentration; and separating the organic layer from the aqueous layer.

2. The method of claim 1, wherein organophosphorus concentration comprises methyl phosphonic acid.

3. The method of claim 2, wherein the organophosphorus concentration further comprises ethylmethyl phosphonic acid.

4. The method of claim 1, wherein the organosulfur concentration comprises disulfide compounds.

5. The method of claim 1, wherein the chemical agent comprises at least one of VX and RVX nerve agent.

6. The method of claim 1, further comprising removing the organophosphorus concentration from the aqueous layer to produce a depleted organophosphorus aqueous layer.

7. The method of claim 6, wherein removing the organophosphorus concentration from the aqueous layer comprises:

oxidizing the organophosphorus concentration;

precipitating the oxidized organophosphorus concentration from the aqueous layer; and separating the precipitated organophosphorus concentration from the aqueous layer.

8. The method of claim 7, wherein the aqueous layer comprises a pH from about 4.5 *to about* 6.0.

9. The method of claim 7, wherein precipitating comprises adding a precipitating agent to the aqueous layer.

10. The method of claim 9, wherein the precipitating agent comprises an iron source.

11. The method of claim 7, wherein separating the precipitated oxidized organophosphorus concentration from the aqueous layer comprises filtering the aqueous layer.

12. The method of claim 7, further comprising disposing of the removed phosphorus concentration.

13. The method of claim 12, wherein disposing comprises placing the removed organophosphorus concentration in a landfill.

14. The method of claim 1, further comprising removing the organosulfur concentration from the organic layer.

15. The method of claim 14, wherein removing the organosulfur concentration from the organic layer comprises:

oxidizing the organosulfur concentration of the organic layer to form a single aqueous layer;

combining the single aqueous layer with the depleted organophosphorus aqueous layer and biological material to produce a mixture; and biologically degrading the mixture.

16. The method of claim 15, wherein the organic layer comprises a pH from about 3 to 5.

17. The method of claim 15, further comprising disposing of the biologically degraded mixture.

18. The method of claim 17, wherein disposing of the biologically degraded mixture comprises:

filtering the mixture to produce an effluent and a solid phase;

discharging the effluent into a water source; and placing the solid phase in a landfill.

19. A method of treating a hydrolysate of a chemical agent, comprising:

oxidizing the hydrolysate of a chemical agent to form an aqueous layer and an organic layer, the aqueous layer comprising an organophosphorus concentration and the organic layer comprising an organosulfur concentration;

separating the organic layer from the aqueous layer;

removing the organophosphorus concentration from the aqueous layer; and removing the organosulfur concentration from the organic layer.

20. A method of treating a hydrolysate of a chemical agent, comprising:

oxidizing a hydrolysate of a chemical agent to form an aqueous layer and an organic layer, the aqueous layer comprising an organophosphorus concentration and the organic layer comprising an organosulfur concentration, and oxidizing and precipitating the organophosphorus concentration from the aqueous layer.

21. A method of treating a hydrolysate of a chemical agent, comprising:

oxidizing an organophosphorus concentration of a chemical agent hydrolysate solution, comprising contacting the organophosphorus concentration with an oxidizing agent, a metal catalyst selected from iron, magnesium, and combinations of these, and optional pH adjusting chemical species; and precipitating the oxidized organophosphorus concentration from the hydrolysate solution.

22. The method of claim 21, wherein the oxidized organophosphorus concentration is precipitated as an iron-phosphorous polymer.

23. The method of claim 21, wherein the chemical agent comprises at least one of VX, RVX, Sarin (GB), Soman (GD), and Tabun (GA).

24. A method for destroying chemical agents capable of use as chemical weapons comprising oxidizing a hydrolysate of a chemical agent to form an aqueous layer and an organic layer, the aqueous layer comprising an organophosphorus concentration and the organic layer comprising an organosulfur concentration; and separating the organic layer from the aqueous layer.

25. The method of claim 24 wherein the chemical agent is a nerve agent.

26. The method of claim 25 wherein the nerve agent comprises at least one of VX, RVX, Sarin, Soman or Tabun.

* * * * *